SLIDE FASTENERS

Original Filed Oct. 22, 1956 6 Sheets-Sheet 1

INVENTORS
JOSEF RUHRMANN
KURT STREICHER
ERNST PODOVITSCH
BY R. C. Hecht
ATTORNEYS.

SLIDE FASTENERS

Original Filed Oct. 22, 1956 6 Sheets-Sheet 2

INVENTORS
JOSEF RUHRMANN
KURT STREICHER
ERNST PODOVITSCH
BY R. C. Weech
ATTORNEYS.

SLIDE FASTENERS

Original Filed Oct. 22, 1956 6 Sheets-Sheet 3

INVENTORS
JOSEF RUHRMANN
KURT STREICHER
ERNST POPOVITSCH
BY R. E. Meech
ATTORNEYS.

SLIDE FASTENERS

Original Filed Oct. 22, 1956 6 Sheets-Sheet 4

INVENTORS
JOSEF RUHRMANN
KURT STREICHER
ERNST POPOVITSCH
BY R. E. Meech
ATTORNEYS.

SLIDE FASTENERS

Original Filed Oct. 22, 1956 6 Sheets-Sheet 5

INVENTORS
JOSEF RUHRMANN
KURT STREICHER
ERNST PODOVITSCH
BY R. E. Mecch
ATTORNEYS.

SLIDE FASTENERS

Original Filed Oct. 22, 1956 6 Sheets-Sheet 6

INVENTORS
JOSEF RUHRMANN
KURT STREICHER
ERNST POPOVITSCH
BY R. C. Speech
ATTORNEYS United States Patent Office Re. 26,086
Reissued Sept. 20, 1966

26,086
SLIDE FASTENERS

Josef Ruhrmann, Stuttgart-Vaihingen, Kurt Streicher, Echterdingen, near Stuttgart, and Ernst Popovitsch, Echterdingen, near Stuttgart-Busnau, Germany, by Talon, Inc., Meadville, Pa., a corporation of Pennsylvania Original No. 3,149,387, dated Sept. 22, 1964, Ser. No. 174,815, Feb. 21, 1962, which is a continuation of Ser. No. 714,801, Feb. 12, 1958, which in turn is a division of Ser. No. 617,336, Oct. 22, 1956. Application for reissue Oct. 22, 1965, Ser. No. 505,140
21 Claims. (Cl. 24—205.1)

Matter enclosed in heavy brackets [ ] appears in the original patent but forms no part of this reissue specification; matter printed in italics indicates the additions made by reissue.

The present invention relates to slide fasteners, and more particularly, to a stringer for slide fasteners.

This application is a continuation of our patent application Serial No. 714,801, filed February 12, 1958, entitled "Slide Fasteners" and now abandoned, which application No. 714,801 is a division of our patent application Serial No. 617,336, filed October 22, 1956, and now abandoned.

One of the objects of the present invention is to provide a stringer for slide fasteners which may be conveniently and economically manufactured from a continuous filament having the properties of wire.

A further object of the invention is to provide a slide fastener stringer wherein the scoops of the stringer are composed of portions of a continuous filament having the properties of wire.

An additional object of the present invention is to provide a stringer wherein the position of the scoops with respect to the band or tape structure which carries the same remains unchanged during use.

Still another object of the invention is to provide a stringer wherein the scoops are protected from the influence of temperature changes and wherein the stringer itself may have a portion which covers the slide fastener structure.

With the above objetcs in view, the present invention consists generally of a stringer for a slide fastener, this stringer including an elongated continuous filament having the characteristics of wire and having a zigzag configuration provided with a series of ladder-like transverse portions, all of which are substantially U-shaped at least at intermediate parts thereof so as to form scoops, and a series of longitudinal portions interconnecting the transverse filament portions which are designated herein as being the inner ends or heel portions thereof and respectively located alternately at opposite ends of the scoops, these scoops each being provided substantially at a central portion thereof with a head portion which are designated herein as being the outer ends of the transverse portions. A band means, composed at least in part of a tape, is fastened to the filament at least at parts of the inner end portions of the transverse portions of the scoops which are adjacent the longitudinal or heel portions of the filament so as to leave the heel portions at least partially exposed primarily for the purpose of permitting the flanges of the slider to move therealong and in contact therewith.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary perspective view illustrating one stage in the process of manufacture of a stringer according to the present invention, FIG. 2 shows the completed stringer formed according to the process shown in FIG. 1, FIG. 2 being a fragmentary perspective view also, FIG. 3 is a fragmentary perspective view illustrating a stage in another embodiment of a process according to the present invention, FIG. 4 is a fragmentary perspective view of a stringer completed from a process which includes the stage shown in FIG. 3,

Figure 7:
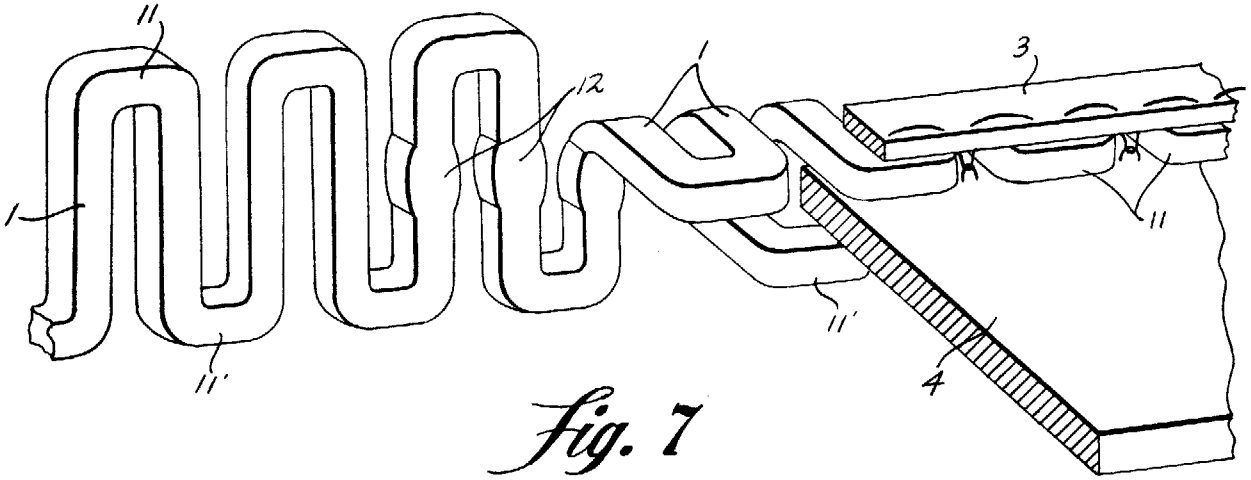
Figure 8:
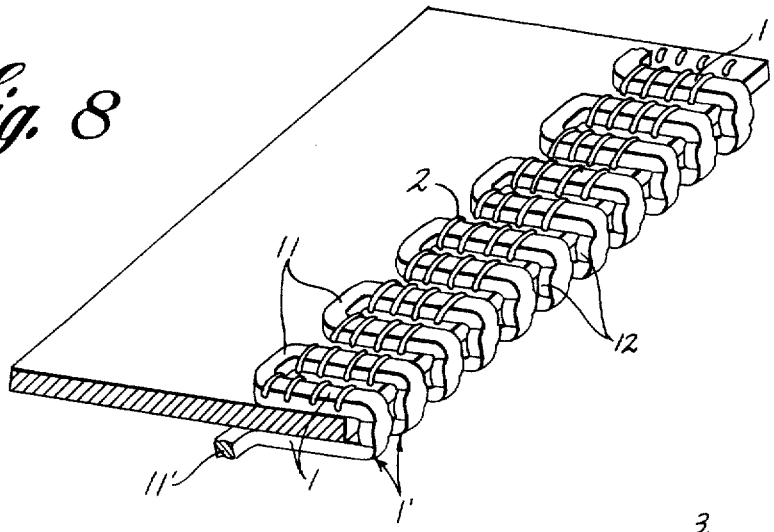
Figure 9:
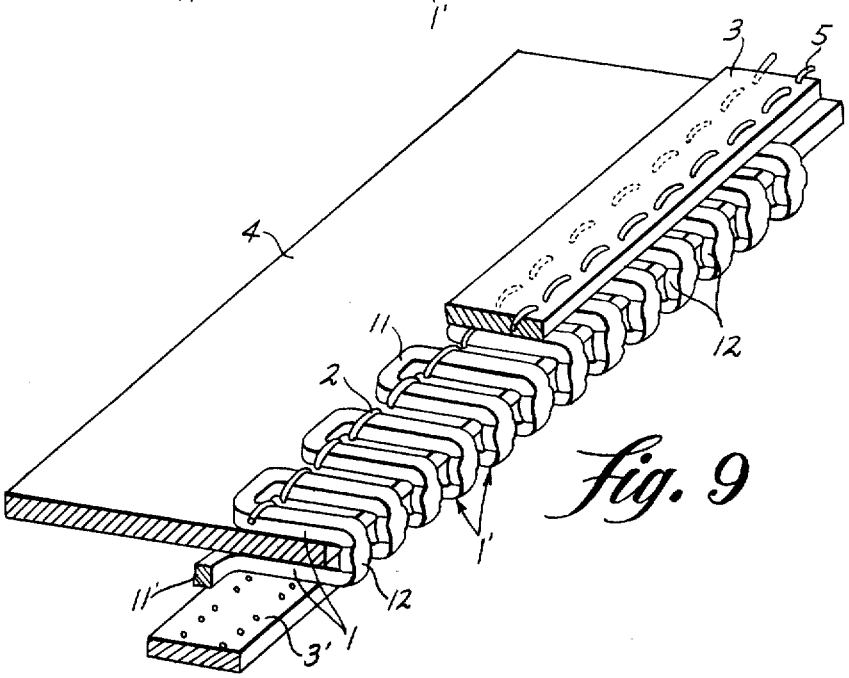
Figure 10:
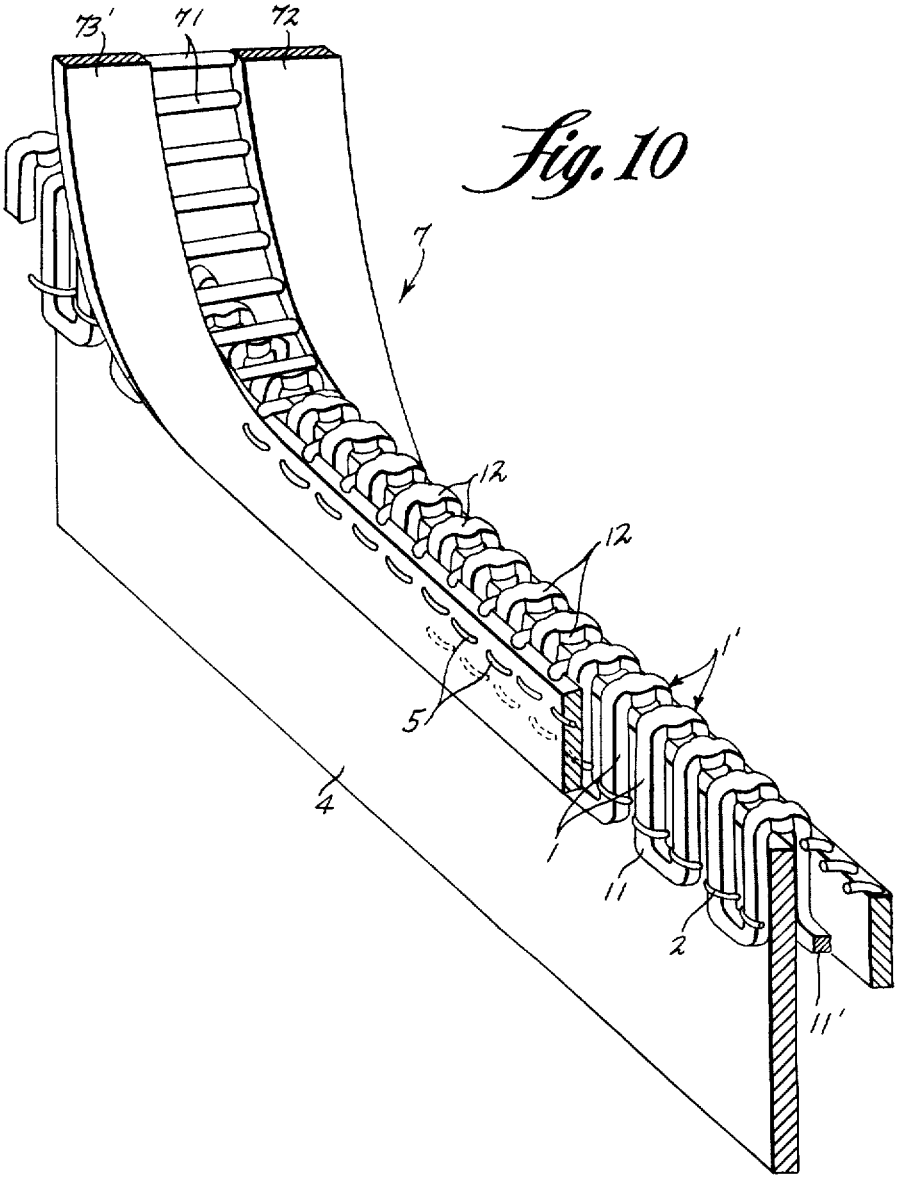

FIG. 7 is a perspective fragmentary view of another embodiment of the stringer made according to the present invention, FIG. 8 is a fragmentary perspective view of still another embodiment of a stringer made according to the present invention, FIG. 9 is a perspective view illustrating a process for manufacturing still a further embodiment of a stringer according to the present invention, FIG. 10 is a fragmentary perspective view illustrating a further embodiment of a stringer according to the present invention, FIG. 11 is a fragmentary perspective view showing a still further embodiment of a stringer according to the present invention, and FIG. 12 is a fragmentary perspective view illustrating one more stringer according to the present invention as well as the process for manufacturing this stringer.

Figure 1:
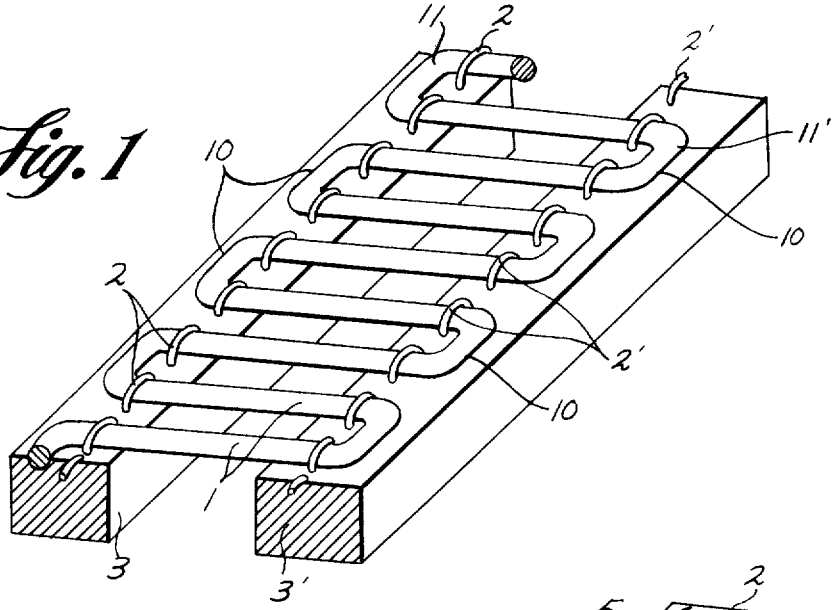
Figure 2:
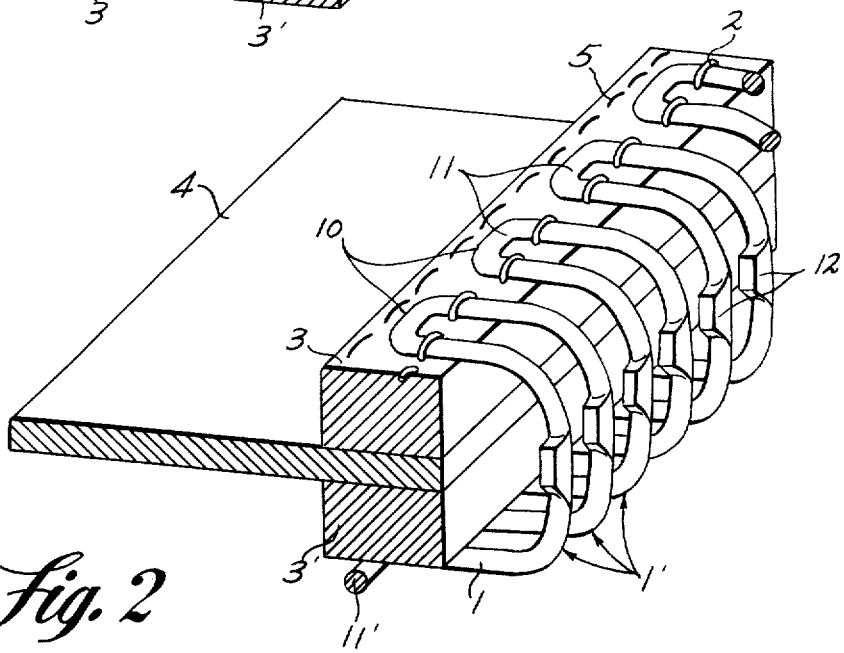

Referring now to the drawings and to FIGS. 1 and 2 in particular, in accordance with the present invention an elongated filament which has the characteristics of wire is bent into the zigzag configuration shown most clearly in FIG. 1. The filament may be a wire or it may be made of a plastic material having the characteristics of wire, such as, for example, glass, styrene, or nylon.

As is apparent from FIG. 1, the continuous filament is bent into a zigzag or meandering configuration so as to provide a series of transverse substantially parallel ladder-like portions 1 interconnected at opposite sides of the bent filament by a series of inner longitudinal heel portions 11 and 11' which are alternately located at opposite sides of the zigzag filament.

After the filament is formed into the zigzag configuration indicated in FIG. 1 it is placed at opposite sides thereof on a pair of flexible members, such as braids or cords 3 and 3', as shown in FIG. 1, and then the transverse portions 1 of the filament which are adjacent to the longitudinal *heel* portions 11 and 11' are fastened to the cords 3 and 3' as by being sewn thereto with the stitches 2 and 2', respectively.

Thereafter, the transverse portions of the filament are all bent in the same direction into a substantially U-shaped configuration so as to form scoop portions 1' which are clearly illustrated in FIG. 2 substantially parallel to one another *and in alignment*. It will be noted that the direction of bending of the transverse filament portions is such that the cords 3 and 3' are directed toward each other and become located in the longitudinal space between the transverse portions 1 of the scoops. The tape 4 is located between the cords 3 and 3', and then the cords and tape are fastened together by means of the stitching 5, for example.

The [transverse ladder-like] *U-shaped scoop* portions of the filament are pressed or otherwise deformed so as to provide interlocking head portions 12 as shown in FIG. 2. It will be noted that the transverse portions *1* of the scoops are interconnected at the inner ends thereof by heel portions *11–11'* [of a] *having* substantially U-shaped configuration *so as to provide longitudinally extending base portion 10*. Furthermore, it should be noted that after the filament is bent into the zigzag configuration indicated in FIG. 1, the remaining steps described above may be carried out in any desired sequence. Thus, the heads 12 may be formed on the [transverse] *U-shaped scoop* portions of the filament at the outer ends thereof before the latter is attached to the cords 3 and 3', or after the filament is attached to the cords 3 and 3' and before the transverse filament portions are bent so as to provide the scoops. Also, it is possible to provide the heads after the scoops are formed. Also, it is possible to bend the transverse portions of the filament so as to form the scoops, and then the transverse portions of the scoops adjacent the inner ends thereof may be attached to the cords which are then attached to the tape 4 in the manner described above. It will be seen that the stitches 2 and 2' are located relatively close to the longitudinal portions 11 and 11' of the filament, so that the possibility of shifting of the scoops with respect to the cords 3 and 3' is reduced to a minimum but at the same time leaving the outer sides of these longitudinal or heel portions exposed.

Thus it will be seen that the filament is formed so as to provide two series of pairs of spaced-apart ladder-like transverse portions 1 with each pair interconnected at one end by a substantially U-shaped portion so as to provide a series of spaced-apart substantially parallel scoop portions 1' having a series of longitudinal heel portions 11–11' interconnecting the opposite end of the transverse portion of one pair only with the end of [a] *the* transverse [portion] *portions* of a preceding pair and the end of the opposed transverse portion of said pair to the end of the transverse portion of the following pair with the U-shaped portion of each of the scoops deformed centrally thereof so as to provide an interlocking head portion 12.

Figure 3:
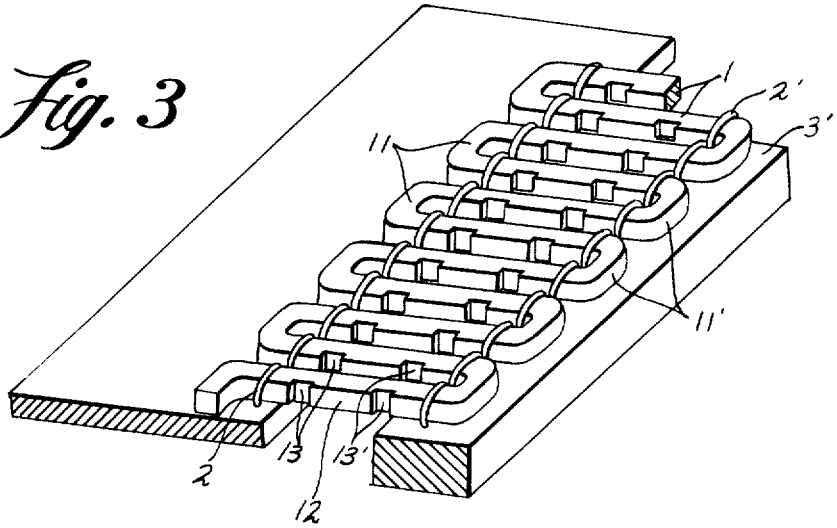
Figure 4:
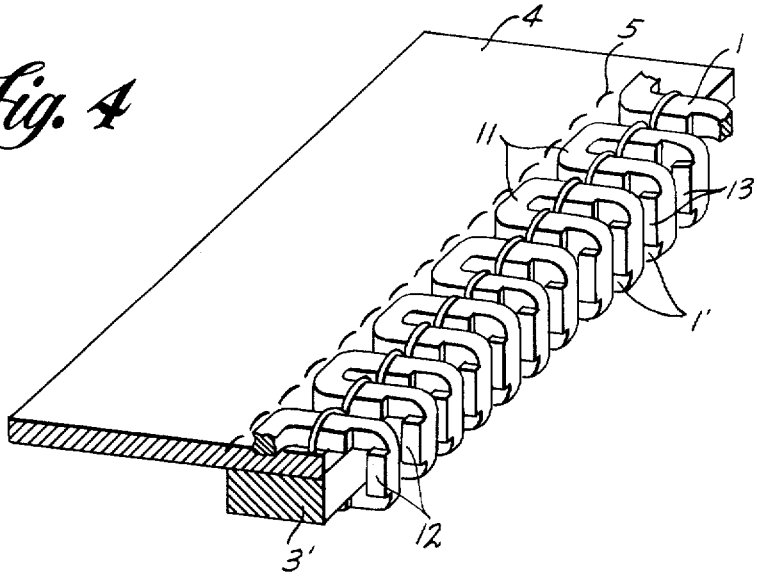

According to the embodiment of the invention which is shown in FIGS. 3 and 4, the filament has a rectangular configuration and is provided with the notches 13 and 13' in each of the transverse portions of the zigzag filament, as is indicated in FIG. 3, so as to provide head portions 12 therebetween this embodiment of the invention, a cord 3' is attached by the stitching 2' to one side of the zigzag filament, while the tape 4 is attached to the transverse portions at the other side of the filament, as indicated in FIG. 3. Now when the transverse filament portions are bent so as to provide the scoops, the tape 4 and the cord 3' will be located next to each other in the manner shown in FIG. 4, and these elements may be attached to each other by the stitching 5. As was pointed out above, the heads 12 may be formed on the scoops at any time after the wire has the zigzag configuration shown in FIG. 3, and furthermore it is possible to provide the scoops shown in FIG. 4 before the filament is attached to the cord and tape. Thus, with the embodiment of FIGS. 3 and 4 only one cord is required, and furthermore the notches 13 and 13' facilitate the bending of the transverse portions of the filament so as to form the scoops which are shown in FIG. 4.

Figure 5:
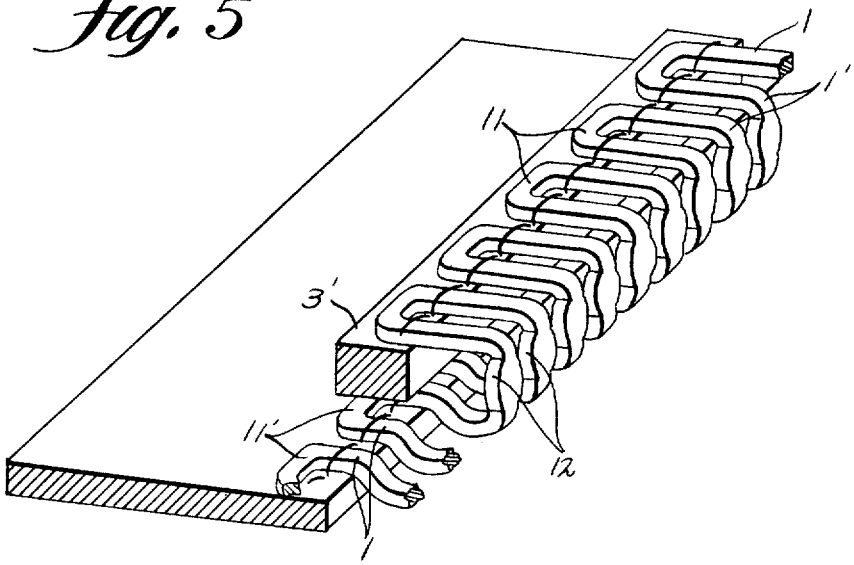
[FIG. 5 is an elevational view illustrating a pair of stringers having the construction shown in FIG. 4 in operative relation with each other and shown in cooperation with a slider,]
Figure 6:
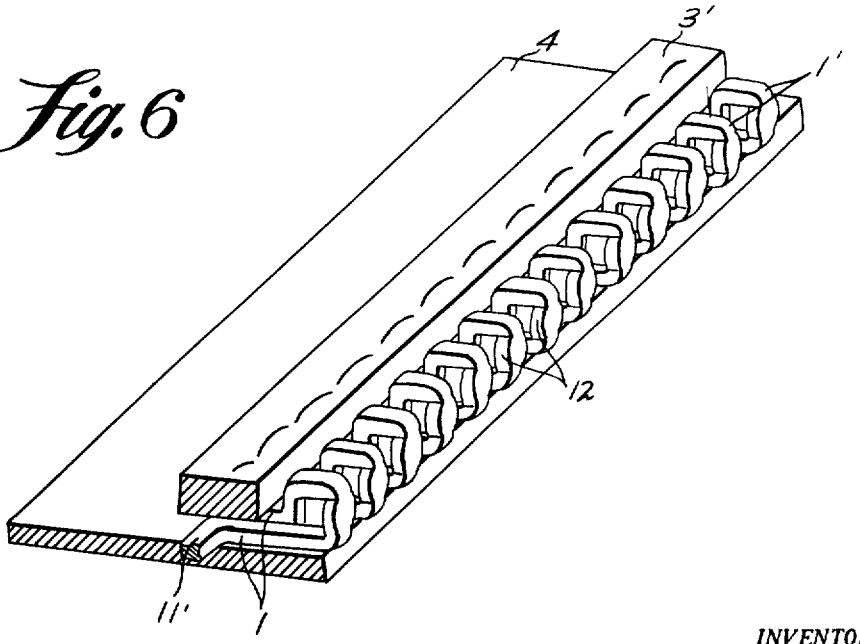
[FIG. 6 is a sectional view taken along line VI—VI of FIG. 5,]

[FIGS. 5 and 6 illustrate the manner in which a pair of stringers having the construction shown in FIG. 4 cooperate with each other. In these figures, a slider 6 is shown with the scoops 1' guided between the flanges thereof for manipulating the same. The slider is provided with a wedge-shaped neck portion 61 so as to provide diverging channels within the slider body. As is apparent from FIGS. 5 and 6, the heads 12 of the scoops 1' of one stringer enter into the pockets formed by the scoops of the other stringer and interlock therewith.]

The embodiment of the invention which is illustrated in FIG. 7 is similar to that of FIGS. 3 and 4 except that the cord 3' and the tape 4 are joined to opposite faces of the zigzag filament. The transverse portions 1 are bent to form the scoops 1' shown in FIG. 7 in a direction which locates the cord 3' in the longitudinal space between the transverse portions of the scoops, and it will be noted that the head portions 12 of the scoops 1' of FIG. 7 have a configuration different from the head portions 12 of FIGS. 3 and 4. The tape 4 is located at the exterior of the longitudinal heel space between the longitudinal portions of the scoops, and the tape 4 may be joined to the cord 3' by suitable stitching after the scoops are formed.

According to the embodiment of the invention which is shown in FIG. 8, the tape 4 and the cord 3' are joined to the same face of the filament, as is the case with FIGS. 3 and 4, but the transverse portions 1 of the filament are bent in a direction opposite to the direction of bending shown in FIG. 4, so that with the embodiment of FIG. 8 the tape 4 and the cord 3' are located at the exterior of the stringer. It will be noted that while the intermediate *heel* portion of each scoop 1' of the embodiment of FIG. 8 still has a substantially U-shaped configuration, the end transverse portions of the scoops are all located substantially in a common plane and are all located between the cord 3' and the tape 4 which are joined together and which serve to join filament to the tape and cord. Furthermore, with the embodiment of FIG. 8 the right side edge of the tape 4, as viewed in FIG. 8 extends to the central portion of the transverse portions of the scoops which carry the heads, so that with this embodiment of the invention the cord 3' not only cooperates with the slider to guide the same, but in addition the slide fastener will be covered by the tapes 4. When the filament is made of certain plastic materials, it may be important to protect the filament from temperature changes, and the covering of the filament both with the tape 4 and the cord 3' in the manner shown in FIG. 8 serves to protect the filament from temperature changes.

According to the embodiment of the invention which is shown in FIG. 9, the zigzag filament which is of rectangular configuration and which is formed with the heads 12 is bent at its transverse portions 1 to form the scoops which are shown at the right portion of FIG. 9, and the tape 4 is placed in the longitudinal space between the transverse portions of the scoops while a single cord 3 is located at the exterior of the filament along the longitudinal heel portions at one side of the scoops. With this arrangement the tape 4 and the cord 3 may be joined to each other by suitable stitching and to the transverse portions 1 in a single continuous step.

FIG. 10 shows an arrangement in which the tape 4 is also located in the longitudinal space between the transverse portions 1 of the scoops, but with the embodiments of FIG. 10 the cords 3 and 3' take the form of strips of fabric which are placed at the outer faces of the transverse portions 1 of the filament, and after the tape 4 is joined to the filament by the stitches 2, the stitches 5 serve to join the strips 3 and 3' to the tape 4. Thus, with the embodiment of FIG. 10 the filament will also be protected against temperature changes.

According to an embodiment of the invention shown in FIG. 11, no cords are used. The tape 4 is again placed in the longitudinal space between the lateral portions of the scoops, and then a series of stitches 2 are provided in order to fasten the filament to the tape 4. It will be noted that the stitches are arranged close together and substantially cover the transverse portions 1 of the scoops 1', so that the covering provided by the stitches 2 also serve to protect the filament against temperature changes. It will be noted that the stitches 2 are always located close to the longitudinal heel portions 11 and 11' of the filament so as to prevent shifting of the filament with respect to the tape and cord but leaving the outer sides of these longitudinal or heel portions exposed.

According to the embodiment of the invention shown in FIG. 12, the tape 4 is again placed in the longitudinal space between the transverse portions 1 of the scoops 1', and the stitches 2 serve to fasten the tape 4 and the transverse portions 1 of the filament together. However, in the embodiment of FIG. 12, instead of a pair of fabric strips covering the lateral portions of the filament, as indicated in FIG. 10, a single fabric strip 7 is provided, having web portions 72 and 72' which respectively are located at the outer faces of the transverse portions 1 of the filament. These strip portions 72 and 72' are interconnected by yarns or threads 71 which are exposed to an intermediate portion of the strip 7, so that yarns 71 respectively are located between the successive scoops 1', while the strip portions 72 and 72' are disposed on the outer surfaces of the transverse portions 1 of the filament and are then attached to the tape 4 by means of the stitches 5.

It will be understood that each of the elements described above, or two or more together, may also find a useful application in other types of slide fasteners differing from those described above.

It will also be understood that the term "cord" or "fabric strip" as herein used shall mean a substantially round or oval multi-strand twisted or woven structure, or a narrow flat ribbon or tape, or any type of stitching or any other suitable element for forming a band means along the marginal edge of the tape.

While there is shown and described an embodiment which the invention may assume in practice, it will be understood that this embodiment is merely for the purpose of illustration and description, and that other forms may be devised with the scope of the invention as defined in the appended claims.

What we claim as our invention is:

1. A stringer for a slide fastener comprising a filamentary structure having a series of substantially U-shaped scoop portions arranged one behind the other substantially in parallel relation so as to provide two series of transverse portions disposed in juxtaposition with the transverse portions in each series being substantially parallel to one another, the inner end of each of said transverse portions in each of said series being connected only to the inner end of a preceding transverse portion and, the inner end of each of the opposed transverse portions in the other series being connected only to a succeeding transverse portion so as to provide a series of substantially U-shaped [heel] portions,

*each of said U-shaped portions having a substantially longitudinally extending base portion* an elongated tape arranged along one side of said transverse portions so that the scoop portions extend outwardly from the marginal edge of the tape, the transverse portions of each series being located substantially in a common longitudinally extending plane *substantially parallel to said tape* and with said [heel] base portions also being located substantially in a common longitudinally extending plane *located substantially perpendicular both to the plane of the tape and to the transverse portions,* and means independent of said transverse portions for attaching the same solely in cooperation therewith to the marginal edge portion of the tape between said scoop portions and said heel portions of said filament so as to bind the filament and tape securely together at said transverse portions whereby the heel portions are exposed.

2. In a stringer for a slide fastener, the combination as defined in claim 1, wherein the means independent of the transverse portions for attaching same to the marginal edge portion of the tape consists of a longitudinal line of stitching extending between the transverse portions and through the marginal edge portion of the tape so as to be positioned between the scoop portions and the heel portions of the filament.

3. In a stringer for a slide fastener, the combination as defined in claim 1, including at least one elongated band disposed on one side of at least one series of the transverse portions and directly next thereto, and a longitudinally extending line of stitching extending between the transverse portions and through both said band means and the marginal edge portion of the tape so as to bind the filament, the tape and the band securely together at said transverse portions whereby the heel portions are exposed.

4. In a stringer for a slide fastener, the combination as defined in claim 1, wherein the marginal edge portion of the tape is positioned between the two series of transverse portions so that one series of transverse portions is disposed to either side of the tape whereby the filament straddles the edge of the tape.

5. In a stringer for a slide fastener, the combination as defined in claim 1, including a longitudinally extending band disposed on the outer side of each series of transverse portions and directly next thereto, and a longitudinally extending line of stitching extending between the transverse portions and through both of said band means and the marginal edge portion of the tape so as to bind the filament, the tape and the two bands securely together at said transverse portions whereby the heel portions are exposed.

6. In a stringer for a slide fastener, the combination as defined in claim 1, including at least one elongated band disposed directly next to the marginal edge portion of the tape with the marginal edge portion of the tape together with said band positioned between the two series of transverse portions so that one series of transverse portions is disposed to either side of the tape and band whereby the filament straddles the edge of the tape and band.

7. In a stringer for a slide fastener, the combination as defined in claim 1, wherein the transverse portions of both series of transverse portions are disposed to one side of the marginal edge portions of the tape so that the tape substantially covers one side of the filament with the opposite side thereof at least being partially exposed.

8. A stringer for a slide fastener comprising, in combination, an elongated continuous filament deformed so as to provide two series of transverse portions disposed in juxtaposition with the transverse portions in each series being substantially parallel to one another, said transverse portions of one series being interconnected at the outer ends thereof with those of the other series by means of intermediate substantially U-shaped scoop portions and with said transverse portions in each series being interconnected at the inner ends thereof by means of a series of substantially U-shaped [heel] portions arranged substantially in alignment and substantially parallel to one another,

*each of said U-shaped portions having a substantially longitudinally extending base portion,* and an elongated tape arranged to at least one side of said transverse portions and said heel portions so that the scoop portions extend outwardly from the marginal edge of said tape, the transverse portions of each series being located substantially in a common longitudinally extending plane *substantially parallel to said tape* and with said [heel] *base* portions also being located substantially in a common longitudinally extending plane *located substantially perpendicular both to the plane of the tape and to the transverse portions,* and means independent of said transverse portions for attaching the same solely in cooperation therewith to the marginal edge portion of the tape between said scoop portions and said heel portions of said filament so as to bind the filament and tape securely together at said transverse portions whereby the heel portions are exposed.

9. In a stringer for a slide fastener, the combination as defined in claim 8, wherein the means independent of the transverse portions for attaching same to the marginal edge portion of the tape consists of a longitudinal line of stitching extending between the transverse portions and through the marginal edge portion of the tape so as to be positioned between the scoop portions and the heel portions of the filament.

10. In a stringer for a slide fastener, the combination as defined in claim 8, including at least one elongated band disposed on one side of at least one series of the transverse portions and directly next thereto, and a longitudinally extending line of stitching extending between the transverse portions and through both said band means and the marginal edge portion of the tape so as to bind the filament, the tape and the band securely together at said transverse portions whereby the inner edges of the heel portions are exposed.

11. In a stringer for a slide fastener, the combination as defined in claim 8, wherein the marginal edge portion of the tape is positioned between the two series of transverse portions so that one series of transverse portions is disposed to either side of the tape whereby the filament straddles the edge of the tape.

12. In a stringer for a slide fastener, the combination as defined in claim 8, including a longitudinally extending band disposed on the outer side of each series of the transverse portions and directly next thereto, and a longitudinally extending line of stitching extending between the transverse portions and through both of said band means and the marginal edge portion of the tape so as to bind the filament, the tape and the two bands securely together at said transverse portions whereby the heel portions are exposed.

13. In a stringer for a slide fastener, the combination as defined in claim 9, including at least one elongated band disposed directly next to the marginal edge portion of the tape with the marginal edge portion of the tape together with said band positioned between the two series of transverse portions so that one series of transverse portions is disposed to either side of the tape and band whereby the filament straddles the edge of the tape and band.

14. In a stringer for a slide fastener, the combination as defined in claim 9, wherein the transverse portions of both series of transverse portions are disposed to one side of the marginal edge portion of the tape so that the tape substantially covers one side of the filament with the opposite side thereof at least being partially exposed.

15. A stringer for a slide fastener comprising, in combination, an elongated continuous filament deformed so as to provide two series of transverse portions disposed in juxtaposition with the transverse portions in each series being substantially parallel to one another, said transverse portions of one series being interconnected at the outer ends thereof with those of the other series by means of intermediate substantially U-shaped scoop portions and with said transverse portions in each series being interconnected at the inner ends thereof by means of a series of alternately longitudinally extending portions arranged substantially in alignment and substantially parallel to one another, the longitudinal extending portions of one series being staggered relative to those of the other series, and an elongated tape arranged to at least one side of said transverse portions and said longitudinal portions so that the scoop portions extend outwardly from the marginal edge of said tape, the transverse portions in each series being located substantially in a common longitudinally extending plane *substantially parallel to said tape* with the longitudinal extending portions in each series also being located substantially in a common longitudinally extending plane *substantially perpendicular both to the plane of the tape and to the transverse portions, and* means independent of said transverse portions for attaching the same solely in cooperation therewith to the marginal edge portion of the tape between said scoop portions and said longitudinal portions of said filament so as to bind the filament and tape securely together at said transverse portions whereby the outer sides of the longitudinal portions are exposed.

16. In a stringer for a slide fastener, the combination as defined in claim 15, wherein the means independent of the transverse portions for attaching same to the marginal edge portion of the tape consists of a longitudinal line of stitching extending between the transverse portions and through the marginal edge portion of the tape so as to be positioned between the scoop portions and the heel portion of the filament.

17. In a stringer for a slide fastener, the combination as defined in claim 15, including at least one elongated band disposed on one side of at least one series of the transverse portions and directly next thereto, and a longitudinally extending line of stitching extending between the transverse portions and through both said band means and the marginal edge portion of the tape so as to bind the filament, the tape and the band securely together at said transverse portions whereby the heel portion is exposed.

18. In a stringer for a slide fastener, the combination as defined in claim 15, wherein the marginal edge portion of the tape is positioned between the two series of transverse portions so that one series of transverse portions is disposed to either side of the tape whereby the filament straddles the edge of the tape.

19. In a stringer for a slide fastener, the combination as defined in claim 15, including a longitudinally extending band disposed on the outer side of each series of the transverse portions and directly next thereto, and a longitudinally extending line of stitching extending between the transverse portions and through both of said band means and the marginal edge portion of the tape so as to bind the filament, the tape and the two bands securely together at said transverse portions whereby the heel portions are exposed.

20. In a stringer for a slide fastener, the combination as defined in claim 15, including at least one elongated band disposed directly next to the marginal edge portion of the tape with the marginal edge portion of the tape together with said band positioned between the two series of transverse portions so that one series of transverse portions is disposed to either side of the tape and band whereby the filament straddles the edge of the tape and band.

21. In a stringer for a slide fastener, the combination as defined in claim 15, wherein the transverse portions of both series of transverse portions are disposed to one side of the marginal edge portion of the tape so that the tape substantially covers one side of the filament with the opposite side thereof at least being partially exposed.

References Cited by the Examiner

The following references, cited by the Examiner, are of record in the patented file of this patent or the original patent.

UNITED STATES PATENTS

| | | |
|---|---|---|
| 2,066,060 | 12/1936 | Sipe. |
| 2,067,734 | 1/1937 | Silberman. |
| 2,087,456 | 7/1937 | Sundback. |
| 2,919,482 | 1/1960 | Casson. |

FOREIGN PATENTS

| | | |
|---|---|---|
| 542,962 | 12/1955 | Belgium. |
| 928,222 | 5/1955 | Germany. |
| 600,127 | 4/1948 | Great Britain. |

BERNARD A. GELAK, *Primary Examiner.*

UNITED STATES PATENT OFFICE
CERTIFICATE OF CORRECTION

Reissue No. 26,086

September 20, 1966

Josef Ruhrmann et al.

It is hereby certified that error appears in the above numbered patent requiring correction and that the said Letters Patent should read as corrected below.

In the grant, line 6, and in the heading to the printed specification, lines 6 and 7, after "Pennsylvania", each occurrence, insert --,assignee --; in the drawings, Fig. 10, for "73′" read -- 72′ --; column 1, lines 40 to 42, for "and wherein the stringer itself may have a portion which covers the slide fastener structure" read -- [and wherein the stringer itself may have a portion which covers the slide fastener structure] --; same column 1, line 43, for "objetcs" read -- objects --; column 2, line 19 and column 4, lines 1, 4 and 8, for "7", each occurrence, read -- [7] --, and insert after, -- 5 --, in italics; column 2, line 22 and column 4, lines 15, 19, 23, 28, 29 and 38, for "8", each occurrence, read -- [8] --, and insert after, -- 6 --, in italics; column 2, line 25, and column 4, lines 41 and 44, for "9", each occurrence, read -- [9] --, and insert after, -- 7 --, in italics; column 2, line 28, column 4, lines 51, 54, and 59 and column 5, line 8, for "10", each occurrence, read -- [10] --, and insert after, -- 9 --, in italics; column 2, line 31, and column 4, line 62, for "11", each occurrence, read -- [11] --, and insert after, -- 8 --, in italics; column 2, line 34, and column 5, lines 2 and 6, for "12", each occurrence, read -- [12] --, and insert after, -- 10 --, in italics; column 3, line 7, for "portion" read -- [portion] --, and insert after, -- portions --; column 4, line 33, for "slide fastener" read -- [slide fastener] --, and insert after, -- filament --, in italics; line 34, for "tapes" read -- [tapes] --, and insert after, -- tape --, in italics; line 53, for "embodiments" read -- [embodiments] --, and insert after, -- embodiment --, in italics; same column 4, line 73, for "and cord" read -- [and cord] --; column 5, line 57, for "base", read -- base --, in italics; column 5, lines 64, 66 and 74, column 6, lines 9, 25, 58 and 71 and column 7, lines 6, 17 and 32 and column 8, lines 24 and 40, for "heel", each occurrence, read -- [heel] --, and insert after, -- base --, in italics; column 7, line 59, before "portions" insert -- base --, in italics.

Signed and sealed this 28th day of November 1967.

(SEAL)
Attest:
EDWARD M. FLETCHER, JR.
Attesting Officer

EDWARD J. BRENNER
Commissioner of Patents